United States Patent [19]

Braymand

[11] Patent Number: 4,849,235

[45] Date of Patent: Jul. 18, 1989

[54] METHOD FOR PASTEURIZING FOOD PRODUCTS IN CONTAINERS

[75] Inventor: Robert Braymand, Villefranche Sur Saone, France

[73] Assignee: Societe Nouvelle Baele Gangloff, O Venissieux, France

[21] Appl. No.: 927,760

[22] Filed: Nov. 5, 1986

[30] Foreign Application Priority Data

Nov. 5, 1985 [FR] France ............... 85 16782

[51] Int. Cl.$^4$ .............................................. A23L 3/02
[52] U.S. Cl. ..................................... 426/232; 426/407
[58] Field of Search .................. 426/407, 521, 232

[56] References Cited

U.S. PATENT DOCUMENTS 4,490,401 12/1984 Becker et al. .................. 426/521
4,693,902 9/1987 Richmond et al. .............. 426/232

FOREIGN PATENT DOCUMENTS 0204138 12/1986 European Pat. Off. ............ 426/521
1097261 6/1984 U.S.S.R. .............................. 426/521

*Primary Examiner*—Donald E. Czaja
*Assistant Examiner*—Mary S. Mims
*Attorney, Agent, or Firm*—Darby & Darby

[57] ABSTRACT

A method for Abstract pasteurization of food products contained in containers, such as bottles, characterized by the subdivision of at least part of the assembly constituted by the zones of prepasteurization and pasteurization, into elementary zones of regulation, in each of which in a calculation is made of the number of UP's (Units of Pasterization acquired by at least one reference container passing through at least part of the elementary zone, and in that pasterurization is caused to stop in the zone when the reference container, or at least one of the reference containers has acquired a predetermined maximum number of UP's and when all the other reference containers, if any, have acquired at least a predetermined minimum number of UP's.

4 Claims, 4 Drawing Sheets

METHOD FOR PASTEURIZING FOOD PRODUCTS IN CONTAINERS

The present invention relates to the pasteurization of food products in containers such as, for example, bottles or cans.

In order to give them good stability on both the biological and the gustatory plane, it is necessary to expose food products, whether dairy products, fruit juices or alcoholic products such as beer, to a pasteurization operation after they have been packaged in containers such as bottles or cans.

The operation of pasteurization is carried out by heating the liquid, packaged in its container, inside a tunnel along which the container is moved, known as a pasteurization tunnel.

In the conventional pasteurizer, the sequence consists of a heat-up phase producing a uniform rise in temperature, a phase of heating at a temperature level and a cooling down phase, the heating and cooling of the container holding the liquid generally being achieved by a spray of water whose temperature is a function of the zone in question.

The conditions under which the pasteurization must take place are a function of the product to be treated, the geographical distribution point, the pollution of the base product and requirements of the law.

For a given product, the operation of pasteurization should require, for example:
- exceeding a temperature threshold for a definite time, which can be very short,
- standing at a temperature for a minimum time,
- the acquisition by the product of a certain number of "units of pasteurization" or UP's,
- not exceeding a predetermined number of UP's.

Remember that a "unit of Pasteurization" or UP is defined as the effect of pasteurization obtained, for example, in beer by holding for one minute at 60° C. (140° F.). The pasteurization effect is by definition the biological destruction produced by holding at a predetermined temperature, which is a function of the product, for a certain time.

The UP number of pasteurization units acquired is given by the following formula:

$$UP = t \times 10^{\frac{T-x}{z}}$$

in which
- t is the duration of the level phase,
- x is a specific constant of the product, equal to 60 in the case of beer, for example,
- T is the temperature in °C. in the course of the level phase,
- z is a parameter which is a function of the bacteria to be destroyed, equal to 7 in the case of beer, for example.

In every case, a superpasteurization is unfavorable since it results in a denaturing of the taste of the liquid, a clouding of the latter and perhaps a cooking thereof.

In practice, the containers containing a liquid to be pasteurized are moved on a belt inside the tunnel where the pasteurization takes place. In this tunnel, the containers are sprayed by a series of banks fed with water, hot or cold where the case applies, at a regulated flow.

FIG. 1, attached, shows a curve 1, in normal operation, of the temperatures inside the containers passing through a pasteurization tunnel. On this curve the temperatures T are plotted on the ordinate, and on the abscissa the lengths L corresponding to the positions of the vessel in the pasteurizer. The temperatures and the pasteurization phenomena resulting therefrom make it possible, conventionally, to divide the pasteurization tunnel, over its total length $L_T$, into four successive zones:
- a first zone 2 called the preheat zone, in which the temperature of the container is brought up without beginning the phenomenon of pasteurization, i.e. the acquisition of UP's.
- a second zone 3 called the prepasteurization zone, in which the temperature rise is terminated and the acquisition of UP's begins, for example 0.1 UP/min substantially from a temperature To of 53° C. in the case of beer,
- a third zone 4, called the pasteurization zone in which the containers are held at the constant temperature of pasteurization TP, for example 60° C., where the essential phenomenon of pasteurzation takes place,
- and finally a fourth and last zone 5, called the cooling zone, in which the containers are gradually cooled until they leave the tunnel, and where the recipients acquire a few more UP's until they have dropped back substantially to the temperature To. As can be seen in the drawing, the total acquisition of UP's takes place in zone Z comprised between the two points at temperature To.

The curve in FIG. 1 corresponds to a normal operation with no particular incident. But in the case where the residence time of a container inside the tunnel is greater than a predetermined value, for example by reason of a stoppage due to a technical incident downstream in the pasteurizer, the number of UP's acquired by the product will be higher than the theoretical value, with the consequent drawbacks.

The attached FIG. 2 shows, by way of illustration, in a pasteurizer corresponding to the curve in FIG. 1, the curve A of the UP's acquired by a given container along the tunnel in the case of a normal operation according to curve 1 in FIG. 1. The UP's are plotted on the ordinate and the lengths L, identical to those in FIG. 1, on the abscissa. It is clear that the acquisition of UP's begins in the prepasteurization zone 3, continues uniformly in the pasteurization zone 4, and terminates in the cooling zone 5 where the total number of UP's acquired lies between the two admissible values of UPmin and UPmax.

Curve B shows the result obtained with this known type of pasteurizer in the case of an accidental stoppage of the conveyor for a certain time, while the container in question is at a point D in the machine. As seen in the figure, the acquisition of UP's continues at D during the stopping time, then resumes in parallel with the preceding curve A, and terminates at the end of travel at a value much higher than the maximum value UPmax admissible for good pasteurization.

In the absence of an incident on the belt, the latter, in known devices, moves the containers, for example bottles, at constant speed. The arrival of bottles at the entrance to the belt itself is not always strictly synchronized with the speed of advancement of the latter. It is therefore noted with these conventional devices that spaces empty of bottles will appear on the conveyor.

Such a lack of bottles at the entry to the pasteurizer first of all has an unfavorable effect on the consumption of energy. On the one hand, as a matter of fact, since the bottles at the entrance to the tunnel are generally very cold, their cold units are recovered to cool the bottles that are leaving; if there is a lack of bottles at the entry, there is no recovery of cold units and it is necessary to provide cold water to cool the emerging bottles. On the other hand, when this shortage of bottles arrives at the outlet, there is no recovery of the cooling water heated by the bottles which are hot as they leave, so that it is necessary to provide heat from the outside to heat the incoming bottles.

With the pasteurization processes used at present, attempts are sometimes made to remedy this lack of bottles due to poor synchronization between the arrival of the latter and the advancement of the bottles in the pasteurizer, by diminishing the speed of advancement in the tunnel. The result then is an excessive pasteurization, with the correlative drawbacks mentioned above.

Curve C in FIG. 2 shows the result obtained with the conventional pasteurizer in question, in the case where it becomes necessary to substantially lower the speed of the belt in order to remedy an excessively slow arrival of recipients. It is clear that the acquisition of UP's takes place uniformly in the pasteurizer, and terminates, finally, in a total number of acquired UP's that is higher than the admissible maximum UPmax.

The present invention relates to a pasteurization process that is not accompanied by the said drawbacks of the present-day process and permits having a variable speed adjusted to production demand. It is characterized by the subdivision of at least a part of the assembly constituted by the zones of prepasteurization and pasteurization, into elementary zones of regulation, in each of which a calculation is made of the number of UP's acquired by at least one reference container passing through at least a part of the said elementary zone, and in that pasteurization is caused to stop in the said zone when the said reference container, or at least one of the said reference containers, has acquired a predetermined maximum number of UP's, and when all the other reference containers, if any, have acquired at least a predetermined minimum number of UP's.

BRIEF DESCRIPTION OF THE DRAWINGS

Advantages and features of the invention are described with reference to preferred embodiments which are intended to illustrate and not to limit the invention and in which:

In FIG. 3 we recognize the curve 1 of the temperature of the product the length of the pasteurizer in normal operation, as well as the successive zones 2, 3, 4 and 5, respectively of the preheat, prepasteurization, pasteurization and cooling zones.

According to the invention the set assembly $Z_r$ of zones 3 and 4 is divided into elementary zones or subzones of regulation 60, 61, 62, ..69, in each of which at least one reference bottle or container is followed with calculation of the number of UP's acquired by this bottle. In the event only one single reference bottle is followed per subzone, there is continuous calculation of the number of UP's acquired by the latter and a cooling is triggered in this zone when this UP number has reached the fixed maximum. But in the event that several reference bottles are followed in the subzone, the cooling is triggered in this zone when at least one reference bottle has reached or exceeded the fixed maximum there, and when all the other reference bottles in this same zone have reached or exceeded the fixed minimum of UP's.

Figure 5:
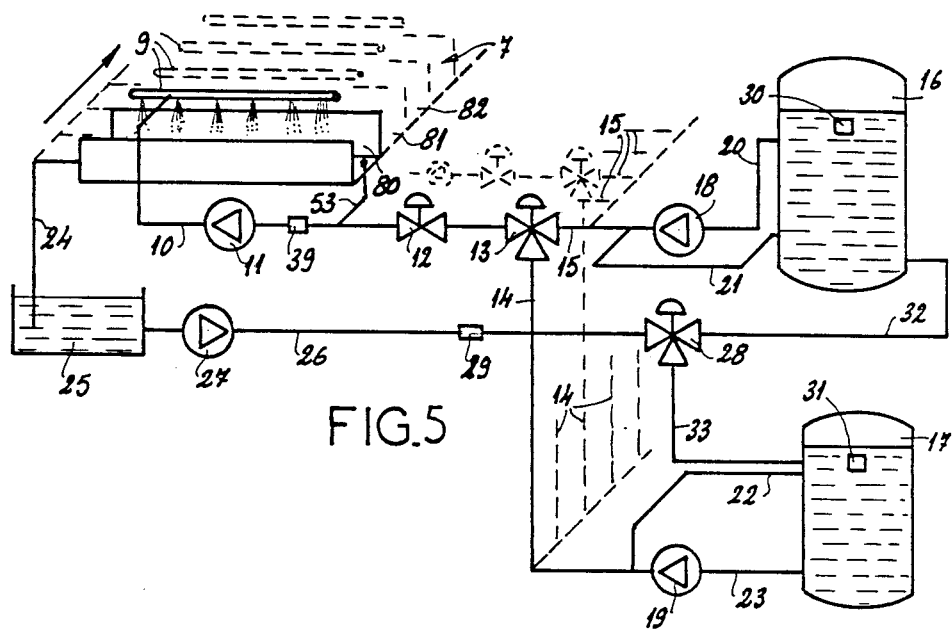
FIG. 5 is a schematic overall view of a device for circulation of heat-bearing fluids permitting implementation of the invention.
Figure 6:
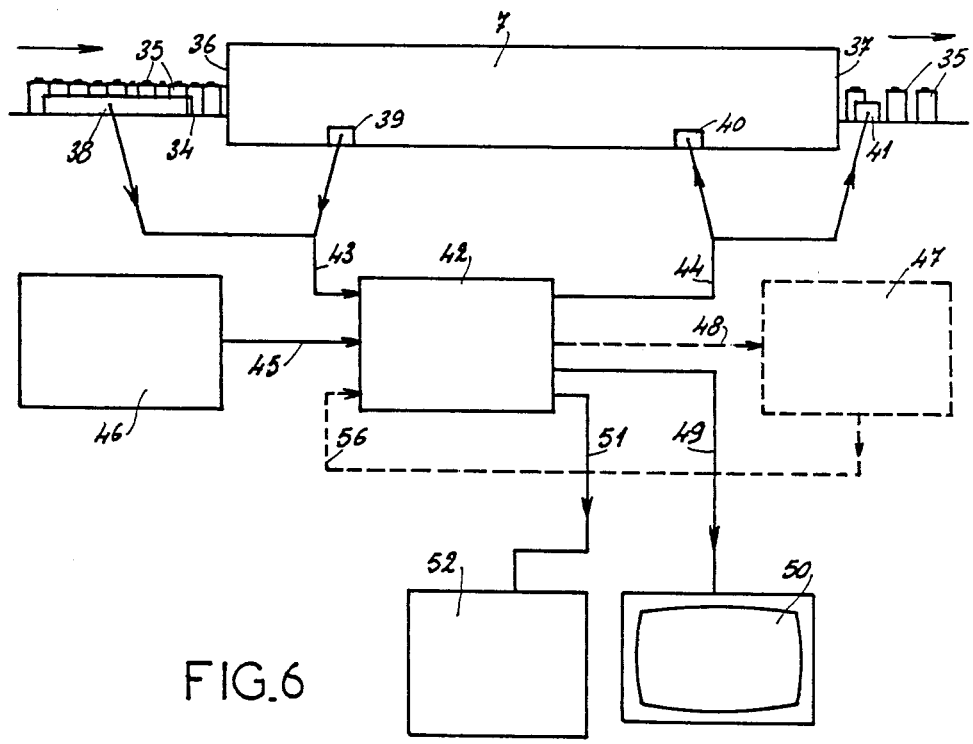
FIG. 6 is a diagram of regulation permitting implementation of the invention.

In order to be able to provide more detailed and clearer explanations concerning the process of the invention, we will first describe, with reference to FIGS. 5 and 6, a preferred device permitting implementation thereof.

Figure 3:
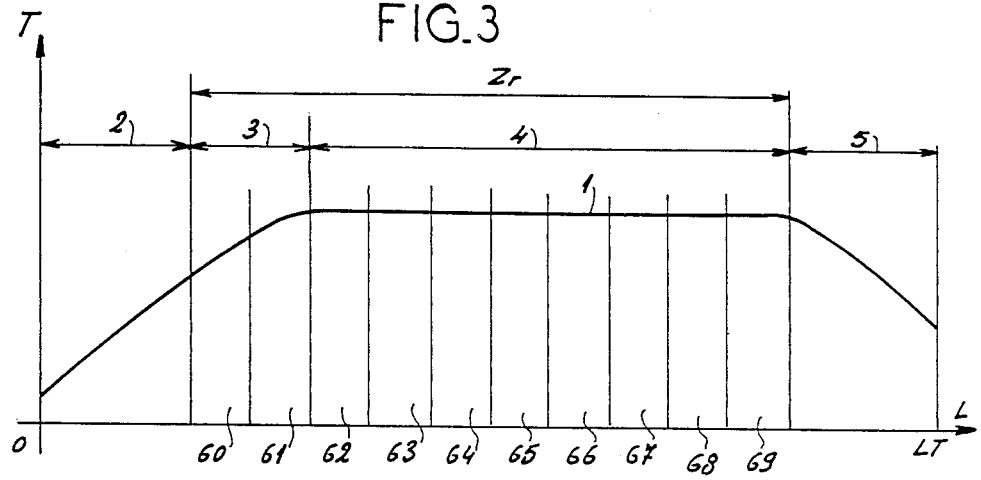
FIG. 3 is a curve of temperatures corresponding to that in FIG. 1 described above, but revealing the process of the invention.

Referring to FIG. 5, pasteurizer 7, very sketchily represented, has been subdivided into a succession of half-boxes 80, 81, 82, . . , physically separated, each conventionally comprising three spray banks 9, only one of which is represented, and materializing, respectively, the subzones 60, 61, 62, . , in FIG. 3.

Each given group of three spray banks 9 associated with a half-box 80, 81, 82,.., is fed with water, hot or cold, through a duct 10 With a pump 11, a regulator valve 12 and a three-way valve 13 equipped with a hot-water input 15 and a cold-water input 14. A return pipe 53 permits a conventional closed circuit spraying when value 13 is closed. A temperature probe 39 permits measuring the spraying temperature in the half-box.

The hot water is stored in a first reservoir 16 where it is kept at constant temperature, for example 75° C. by conventional regulated heating means, not shown, and the cold water is likewise stored in a second reservoir 17 where it is kept at constant temperature, for example, 30° C. by conventional refrigeration-heating means, likewise not shown.

Each reservoir 16, 17 is associated with a respective pump 18, 19, placed in a pumping loop, respectively, 16-20-13-21-16 and 17-22-19-23-17 as represented, each of these two loops being connected, respectively, to the different pipes 15 and 14 feeding hot and cold water to each of the half-boxes 80, 81, 82, . . . , under the command of the different regulator valves 13 and 12.

The spray water overflow of each half-box such as 80 is directed through an overflow pipe 24 toward recovery tanks 25, with, advantageously, one tank per half-box. The recovery water is withdrawn from each tank 25 into a pipe 26 and by a pump 27 and sent toward a three-way valve 28. Valve 28 then directs this recovery water either toward the hot water reservoir 16 through pipe 32, or toward the cold water reservoir 17 through pipe 33, for example, under the command of the microprocessor used to regulate the invention and as a function of the temperature of the water in evacuation duct 26, taken by a temperature probe 29, and the levels of water in reservoirs 16 and 17, taken respectively by level detectors 30 and 31. If, for example, water is lacking in both reservoirs, the temperature probe will determine, through the microprocessor, the delivery of recovery water to one reservoir or the other.

FIG. 6 represents, roughly, a regulation diagram that can be used for implementation of the invention.

The drawing represents, diagrammatically the pasteurization tunnel 7, its associated conveyor 34, and containers 35 entering the pasteurizer at 36 and leaving at 37.

References 38 and 39 designate sensors, 38 being, for example, the set of jamming sensors for pasteurizer 7, and 39 the spray temperature sensors in the subzones of the invention.

A pasteurizer can be equipped with a plurality of jamming sensors, one behind the other upstream, and likewise several other jamming sensors downstream. The absence of jamming at the entrance, or the presence of jamming at the exit indicates that it is time to slow down the belt. The absence of jamming at the outlet or the presence of jamming at the entrance indicates that the belt should be speeded up.

Reference 40 and 41 designate the set of actuators, the first of these acting on the spray temperatures per zone, and the second ones on the speed of advancement of the belt.

A digital computer and command unit 42 with programmed software, receives, at inputs 43, the information from the various sensors 38 and 39, and at outlets 44, emits command signals to the various actuators such as 40 and 41.

Quite obviously, the digital computer and processing unit 42 contain other data inputs, such as input 45 from a unit 46 containing data on production, level temperature, content, maximum and minimum UP's, etc. At least a part of this data is received from detecting means associated with a container. An input 56 is received from a plant supervisor unit 47 which, in turn, receives at 48, data from logic unit 42. Logic unit 42 also contains, conventionally, other outlets such as outlet 49 connected to a control screen 50 and outlet 51 connected to a unit 52 controlling production and plurality.

We will now explain more exhaustively the working, according to the invention, of the pasteurization device in FIGS. 5 and 6.

Figure 7:
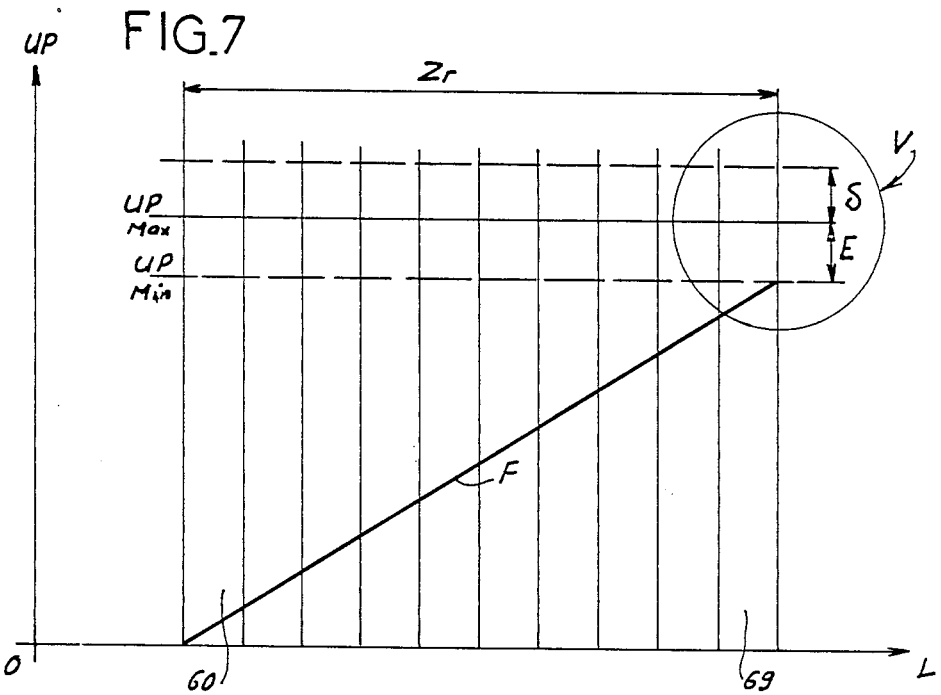
FIG. 7 is a graph of UP acquisition revealing the regulation of the invention.
Figure 8:
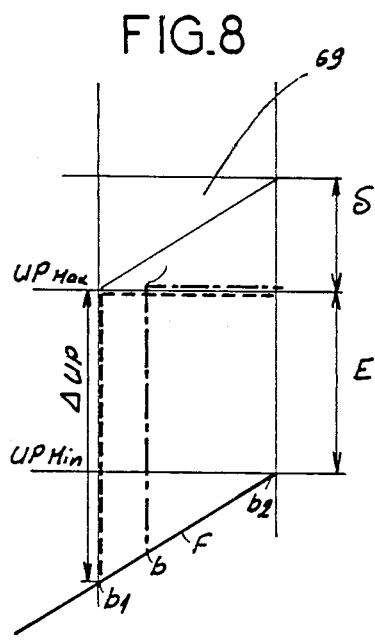
FIG. 8 is the detail of V FIG. 7 to explain the process of the invention in the case where just one reference bottle is used per zone.

Considering first of all the case which is a priori the most simple, and referring to FIGS. 7 and 8, where logic unit 42 is used to follow a single bottle (or other reference container) by receiving data from detecting means of the referenced container, in each of the zones 60 to 69 of the invention, whose assembly $Z_r$ is equal on the preferential example considered to the set of prepasteurization and pasteurization zones.

In FIGS. 7 and 8, the levels UPmax and UPmin define the maximum and minimum numbers of UP's fixed per bottle for good pasteurization. The spread between these two numbers is called E.

Curve F is the curve of normal operation, for a given speed of the conveyor of the pasteurizer. Preferably, in the case of the invention, as seen in the drawings, this curve F is such that each bottle will arrive at the end of the pasteurization zone having acquired the minimum number of UP's and UPmin.

According to the invention, the microprocessor follows, in each zone such as zone 69 shown enlarged in FIG. 8, a reference bottle b from its entry into the zone to its exit therefrom by receiving data from detecting means of the reference bottle. By receiving data about the speed of advancement of the conveyor, the microprocessor determines the position of bottle b at every moment and continuously computes the number of UP's acquired by the latter. Nothing else happens as long as the computed number of UP's acquired by the reference bottle b and detected by detecting means remains below the value UPmax.

But, if, for example, in position b in FIG. 8, the belt has stopped, the computed number of UP's acquired by the reference bottle will rise from b2 to, b where, since the value UPmax has been reached by this bottle, the microprocessor will trigger an immediate cooling in the entire zone 69, stopping the acquisition of UP's not only by the reference bottle but also by all the other bottles in zone 69.

Of course, in the case where the zone in question is not the last subzone of zone $Z_r$, the same cooling is, necessarily, triggered in all of the following zones, moreover, before the one triggered in the zone in question.

It will be noted that, since each elementary zone has a non-zero width, there will be a systematic error on the UP's acquired by the other bottles in the zone, the largest of the latter having been designated by delta in FIGS. 7 and 8.

As a matter of fact, if, for example, the stoppage of the conveyor takes place when the reference bottle is at $b_1$ at the beginning of a zone (FIG. 8), it is clear that it will still acquire, before the cooling is triggered, a number of UP's equal to Delta UP, so that, in this example they will all acquire a total number of UP's greater than UPmax by a value, the greatest of which is the value delta acquired above UPmax by the last bottle $b_2$ in zone 69.

The process therefore, in this case, leads to a maximum systematic error equal to delta, and this error, practically speaking, remains within acceptable limits if the regulation zones 60 to 69 are sufficiently numerous, hence sufficiently narrow, which is the case in the example considered.

Figure 9:
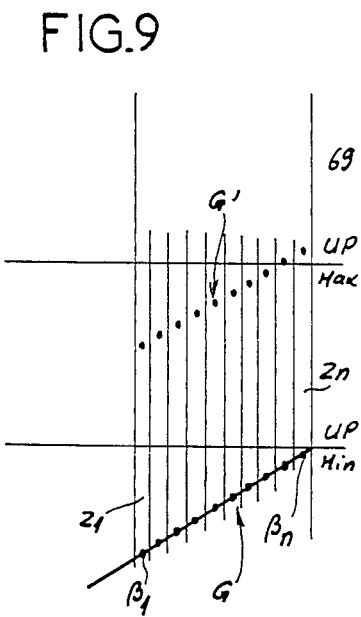
FIG. 9 shows the same detail V when the operation utilizes a plurality of reference bottles per zone.

FIG. 9, a homolog of FIG. 8, is an enlarged view of zone 69 in the variation of embodiment in which zone 69 is subdivided into n sub-zones $z_1$ to $z_n$, each one corresponding, for example, to one step of the conveyor, in each of which the logic unit 42 follows a reference bottle $beta_1$ to beta n during its entire passage through the sub-zone.

The micro-computer computes at every moment, the number of UP's acquired by each reference bottle $beta_1$ to $beta_n$, which enables it to establish at each moment a curve by dots G of the UP's acquired in zone 69.

According to the invention, a premature cooling, hence a cessation of pasteurization, is triggered when:
at least one of the reference bottles has acquired a number of UP's at least equal to UPmax,
all the reference bottles have acquired a number of UP's at least equal to UP min.

Such a case is represented, for example, in FIG. 9 by curve G' on which it is seen that the last two reference bottles have exceeded UPmax while all the others have exceeded UPmin.

Figure 1:
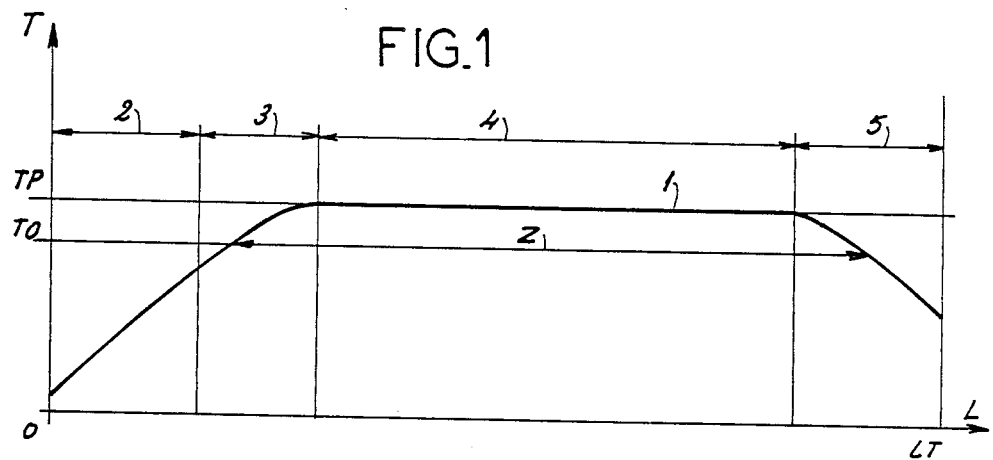
FIG. 1 shows the curve 1 of the temperature inside the containers passing through the pasteurization tunnel.
Figure 2:
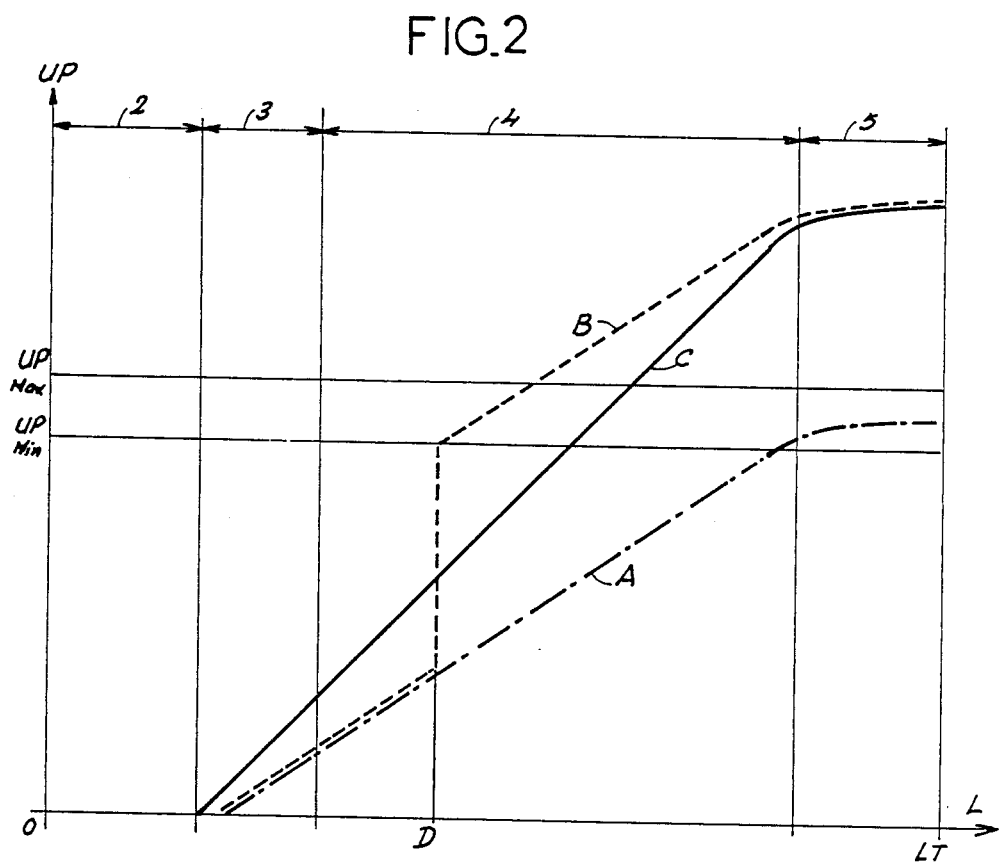
FIG. 2 shows the curve A illustrating the UP acquired by the container along the tunnel when operation is normal according to curve 1 of FIG. 1; the curve B Illustrating the UP acquired by the container during accidental stoppage of the conveyor; and the curve C illustrating the result obtained in the conventional pasteurizer when it is necessary to substantially lower the speed of the belt.
Figure 4:
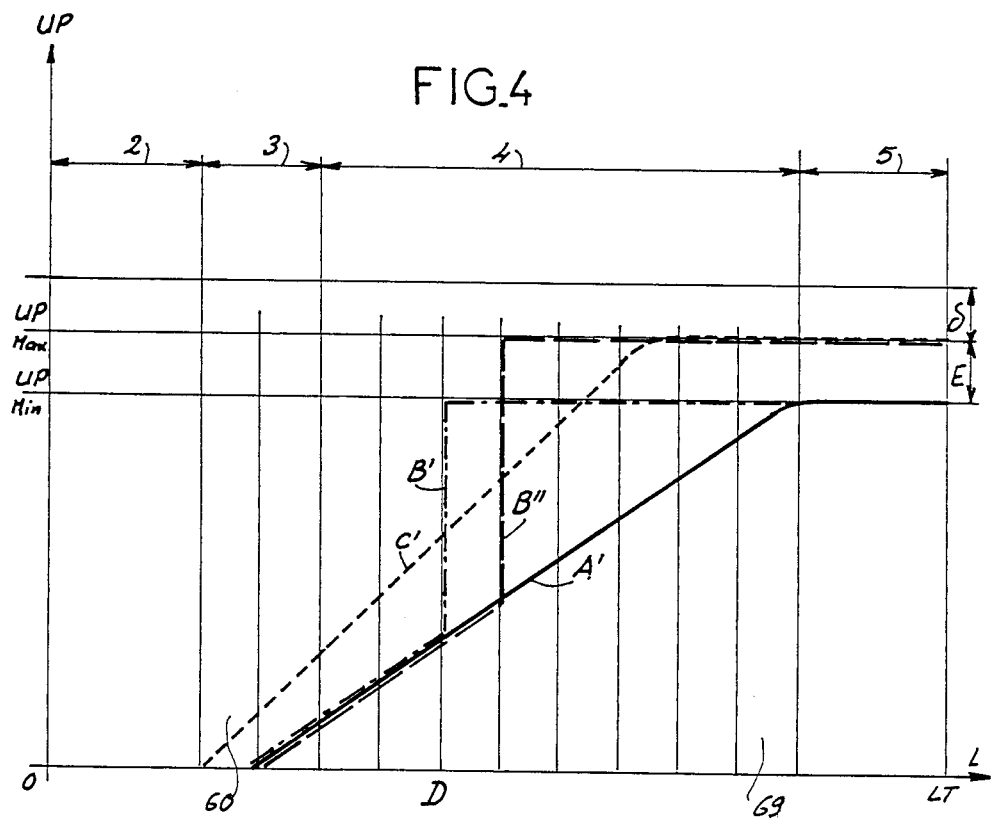
FIG. 4 is a family of UP acquisition curves corresponding to the family in FIG. 2 described above, but produced with the aid of the process of the invention.

The network of curves in FIG. 4, a homolog of that in FIG. 2 relating to the prior art, shows the advantageous effects procured by the invention over prior art.

Curve A', a homolog of curve A, is the normal operating curve which is preferentially for the invention, the curve of minimum UP acquisition.

Curves B' and B" homologs of curve B, are the curves of UP acquisition by two bottles offset longitudinally by a distance that is slightly less than the width of a zone, curve B' relating to a single reference bottle, in the event of a conveyor stoppage at D.

Curve C', a homolog of curve C, is a curve of UP acquisition, with the process of the invention, in a slowdown of the conveyor.

FIG. 4 shows that in every case no bottle acquires a number of UP's higher by the value delta, which is generally acceptable, than the value UPmax.

It will be noted that the logic unit 42, a microprocessor or microcomputer, permits an adaptation of the flow of recipients as a function of the accumulations upstream and downstream. Regulating the speed of the conveyor makes it possible to keep the pasteurization tunnel full at all times, so that heat exchanges between the entry and exit zones are optimized. Furthermore, the knowledge of the speed of passage and the number of UP's accumulated makes it possible to provide optimal spray temperatures with gradual variation, so as to expend a minimum of hot and cold units.

I claim:

1. A method for pasteurizing food products placed in a plurality of containers in a heating apparatus which is subdivided into a plurality of successive zones of temperature regulation, said heating apparatus having monitoring means for monitoring a number of pasteurizing units acquired and location of said containers within the heating apparatus, said method comprising of the following steps:

designating at least one said container as a reference container; said referenced container associated with detecting means, said detecting means being adopted for detecting said number of pasteurizing units acquired and location of said reference container within the heating apparatus;

moving said plurality of containers and said reference container through said plurality of temperature zones within the heating apparatus in such a manner that said food product acquires the pasteurization units while the number of pasteurizing units received and location of the referenced container are detected by the detecting means and transmitted to the monitoring means;

whereby upon obtaining by said referenced container of a predetermined number of the pasteurizing units heating of said referenced container and plurality of containers is stopped and said monitoring means initiates immediate cooling of the temperature zone where the containers are located preventing further acquisition of pasteurization units by said food product.

2. A method according to claim 1, further comprising selecting the width of said subzones so that the maximum number of pasteurization units in excess of said predetermined maximum number of pasteurization units which can be acquired by any of the containers in a given zone of regulation is equal to the systematic error delta.

3. A method according to claim 2, further comprising carrying out the following steps in succession during passage of said containers holding a food product through said heating apparatus:

raising the temperature of said food product in a first zone of said heating apparatus to a temperature below the minimum temperature that would cause said food product to acquire pasteurization units;

heating said food product in a second zone of said heating apparatus to a temperature that will cause said food product to begin acquiring pasteurization units;

maintaining the temperature of said food product in a third zone of said heating apparatus at the pasteurization temperature of said food product; and lowering the temperature of said food products in a fourth zone of said heating apparatus to a temperature below the minimum temperature that would cause said food product to acquire pasteurization units.

4. A method according to claim 3, further comprising subdividing one or more of said second and third zones into two or more zones of regulation.

* * * * *